May 12, 1931. A. W. WOODWARD 1,805,062
LATCHING DEVICE FOR SPLIT RIMS
Filed July 9, 1928
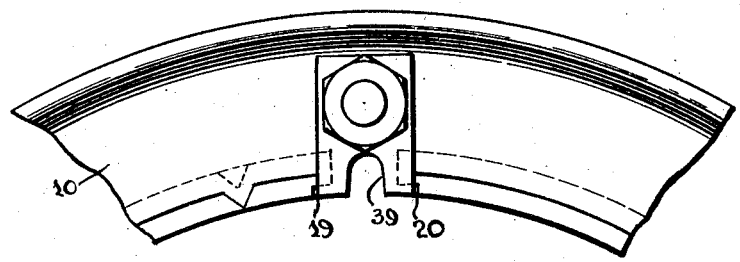
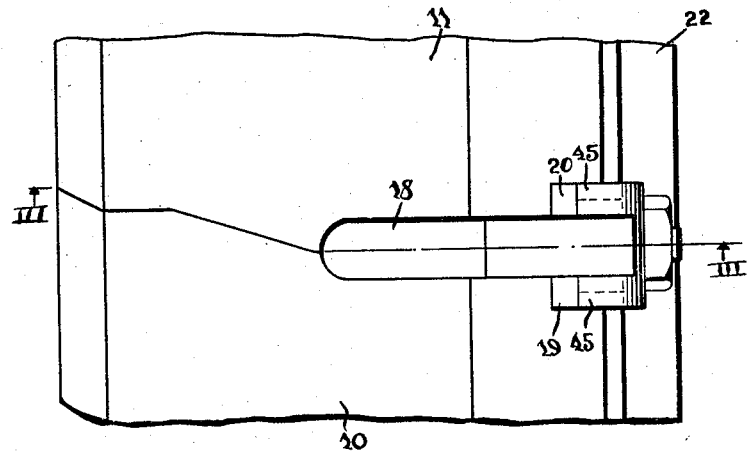
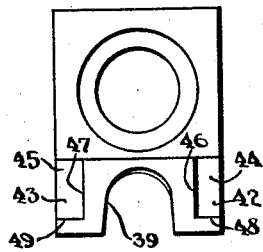
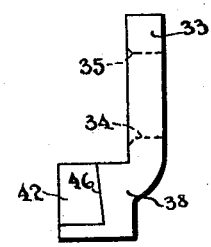
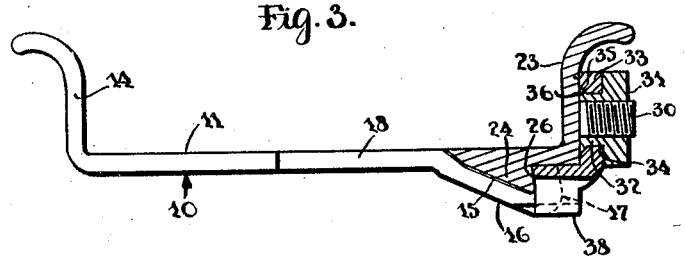
Inventor
Alva W. Woodward.

Patented May 12, 1931

1,805,062

UNITED STATES PATENT OFFICE

ALVA W. WOODWARD, OF AKRON, OHIO, ASSIGNOR TO THE GOODYEAR TIRE & RUBBER COMPANY, OF AKRON, OHIO, A CORPORATION OF OHIO

LATCHING DEVICE FOR SPLIT RIMS

Application filed July 9, 1928. Serial No. 291,171.

This invention relates to vehicle rims embodying an endless side ring and a transversely split member, and it has particular relation to a rim of the above designated character, on which latching devices are employed to maintain the ends of the split member in abutting and aligned relation.

An object of the invention is to provide a latching device for securing the ends of the transversely split member in abutting and aligned relation, which shall be disposed on the side of the rim in order to be accessible from the outside of the wheel.

A rim of the type referred to is comprised of an annular transversely split member having a tire engaging flange at one edge thereof and an interlocking ring, also including a tire engaging flange, at the other. Frequently it has been the practice to further lock the ends of the transversely split member by a latch disposed entirely on the split member.

According to one embodiment of the invention, the latching device comprises an element which is adjustably secured to the tire engaging flange of the endless ring, and provided with a depending portion having projections that engage the ends of the transversely split member, thus maintaining the ends in proper relation to the ring.

For a better understanding of the invention, reference may now be had to the accompanying drawings, forming a part of the specification, of which;

Figure 1 is a fragmentary elevational view of a rim embodying a latching device constructed according to the invention;

Figure 2 is a fragmentary view of the inner peripheral surface of the rim, showing the latching device in its operative position;

Figure 3 is a cross-sectional view, taken substantially along the line III—III of Figure 2; and Figures 4 and 5 are detail views of one of the parts of the latching device.

In the embodiment of the invention employed for the purpose of illustrating its practical features, a rim 10, adapted to be secured in any suitable manner upon the wheel of a vehicle (not shown), comprises a transversely split annular member 11, having a tire engaging flange 14 projecting normally from one edge thereof, and at the opposite edge, a groove 15 formed by an inwardly tapering annular portion 16, and an annular flange 17 at the inner edge thereof, which projects normally to the surface of the member 11. A valve stem opening 18, projecting inwardly toward the center of the member 11 from the edge thereof embodying the groove 15, is intersected by the split in the member 11 likewise projecting inwardly from the opposite edge of the rim. Notches 19 and 20 are formed adjacent the base of the flange 17 and at opposite sides of the valve stem opening 18. An endless locking ring 22, having a tire retaining flange 23 projecting normally from the edge thereof opposite the edge of the member 11 from which the flange 14 projects, also is provided with an inwardly projecting annular rib 24, which is complementary to the groove 15 in the split member 11, and includes a radially extending surface 26 normally abutting the flange 17.

On the outer side of the flange 23 of the endless ring 22, a stud 30 is secured by spot welding or by any other suitable method, which stud receives a nut 31 having a bearing portion 32 projecting from the inner surface thereof normally to the flange 23. The bearing portion 32 supports a lug 33 mounted rotatably thereon and maintained in assembled relation therewith by a flare 36 on the outer end of the bearing portion, which engages a counter-bored surface 35 on the lug. The radially inner end of the lug 33 is provided with a laterally disposed offset portion 38 projecting within the valve stem opening 18, through which a lateral groove 39 extends.

The ends of the flange 17 adjacent the opening 18 project within recesses 42 and 43 formed in opposite edges of the projecting portion 38 and consequently abut the parallel side surface portions 46 and 47 thereof, while the notches 20 and 19 adjacent the ends receive the portions 48 and 49 of the projecting portion which are disposed below the recesses. End surfaces 44 and 45 of the recesses 42 and 43 are engaged by side portions adjacent the ends of the ring, thus preventing outward movement of the latter.

In assembled relation, the lug 33 is secured upon the stud 30 by the nut 31, with its offset portion 38 disposed beneath the ring 22 and in abutment with the radially extending surface 26 of such ring. The groove 39 is disposed centrally with respect to the valve stem opening 18, while the ends of the flange 17 are disposed in the recesses 42 and 43 in abutment with the faces 44, 45, 46 and 47. Normally, the ledges 48 and 49 prevent the ends of the transversely split member 11 from moving radially toward the axis of the rim, the faces 44 and 45 prevent relative rotary movement of the transplit member and the endless ring, while the faces 46 and 47 maintain the ends of the flange 17 against the radial surface 26 of the ring.

From the foregoing description, it is apparent that a simple latching device has been provided that positively maintains the ends of a transversely split member in assembled relation with an endless ring. It is apparent, also, that such a latching device is readily accessible from the outside of the wheel, and consequently may easily be assembled and disassembled with respect to the rim.

Although I have illustrated only one form which the invention may assume and have described in detail only a single application thereof, it will be apparent to those skilled in the art that the invention is not so limited but that various minor modifications may be made therein without departing from the spirit of the invention or from the scope of the appended claims.

What I claim is:

1. The combination with a rim comprising a transversely split member and an endless ring disposed upon the outer periphery of the member adjacent one edge thereof, the split in the member being in communication with the valve stem opening in the member, of a lug connected to the ring and having portions engaging the ends of the member on each side of the valve stem opening therein, said lug having a groove registering with the valve stem opening whereby a valve stem of a tire on the rim may be projected laterally to the outside of the rim.

2. The combination with a rim comprising a transversely split member, and an endless member disposed upon the outer periphery of the member adjacent one edge thereof, the split in the first mentioned member being in communication with a valve stem opening therein, of a lug connected to the endless member and having portions engaging the ends of the split member on each side of the valve stem opening therein.

3. The combination with a rim comprising a transversely split member and an endless member normally interlocked therewith, said endless member having a substantially radially outwardly projecting tire engaging flange, of a latch secured to one side of the flange and having portions engaging the other member.

4. The combination with a rim comprising a transversely split member having a tire engaging flange on one side and an inclined portion at its other, the latter portion terminating in a substantially radially projecting flange, thereby forming a groove in such member, the split in the radial flange being enlarged circumferentially, and an endless member having a tire engaging flange and a portion disposed in the groove of the split member, of a latch secured to the outer side of the tire engaging flange on the endless member and movable axially thereof, said latch having parts projecting into the enlarged portion of the split in the radial flange of the split member.

5. The combination with a rim comprising a transversely split member having a tire engaging flange on one side and an inclined portion at its other, the latter portion terminating in a substantially radially projecting flange, thereby forming a groove in such member, the split in the radial flange being enlarged circumferentially, and an endless member having a tire engaging flange and a portion disposed in the groove of the split member, of a latch secured to the outer side of the tire engaging flange on the endless member and movable axially thereof, said latch having parts projecting into the enlarged portion of the split in the radial flange of the split member, and portions disposed radially inwardly of the inner peripheral surfaces of the ends of the radial flange.

6. The combination of a rim comprising a transversely split member having a gutter at one side thereof, and an endless member partly disposed in the gutter, of a latch secured to the endless member and movable axially thereof, said latch having portions engaging the ends of the split member.

7. The combination of a rim comprising a transversely split member having a gutter at one side thereof, the outer side of such member having a substantially radial flange, and an endless member partly disposed in the gutter, of a latch secured to the endless member and movable axially thereof, said latch having portions abutting the circumferentially extending ends of the radial flange on the split member and other portions engaging axially extending surfaces of the split member.

8. The combination of a rim comprising a transversely split member having a gutter at one side thereof, the outer side of such member having a substantially radial flange, and an endless member disposed in the gutter, of a latch secured to the endless member and movable axially thereof, said latch having portions engaging axially extending surfaces at the ends of the flange.

9. The combination with a rim comprising a transversely split member and an endless member disposed upon the outer periphery of the split member adjacent one edge thereof, the split in the first mentioned member being enlarged beneath the endless member, of a lug connected to the endless member and having portions engaging the ends of the split member on each side of the enlarged portion of the split.

10. The combination with a rim comprising a transversely split member and an endless member disposed upon the outer periphery of the member adjacent one edge thereof, the portion of the split extending beneath the endless member being enlarged, of a lug connected to the endless member and having portions disposed in the enlarged portion of the split, and portions engaging ends of the split member on each side of the enlarged portion of the split.

11. The combination with a rim comprising a transversely split base member having a gutter adjacent one edge thereof, and an endless member disposed on the outer periphery of the split member and partially within the gutter, said endless member projecting axially beyond the gutter edge of the split member, of a latch connected to the axially projecting portion of the endless member and having portions engaging the ends of the split member.

In witness whereof, I have hereunto signed my name.

Signed at Akron, in the county of Summit and State of Ohio, U. S. A., this 7th day of July, 1928.

ALVA W. WOODWARD.